United States Patent
Komada (10) Patent No.: US 10,311,654 B2
(45) Date of Patent: Jun. 4, 2019

(54) SIMULATED DRIVING SYSTEM AND CONTROL DEVICE

(71) Applicant: HORIBA, Ltd., Kyoto (JP)

(72) Inventor: Mineyuki Komada, Kyoto (JP)

(73) Assignee: HORIBA, LTD., Kyoto (JP)

( * ) Notice: Subject to any disclaimer, the term of this patent is extended or adjusted under 35 U.S.C. 154(b) by 39 days.

(21) Appl. No.: 15/557,350

(22) PCT Filed: Feb. 22, 2016

(86) PCT No.: PCT/JP2016/055046
§ 371 (c)(1),
(2) Date: Sep. 11, 2017

(87) PCT Pub. No.: WO2016/143491
PCT Pub. Date: Sep. 15, 2016

(65) Prior Publication Data
US 2018/0033217 A1    Feb. 1, 2018

(30) Foreign Application Priority Data

Mar. 11, 2015    (JP) .................. 2015-047848

(51) Int. Cl.
*G07C 5/00*    (2006.01)
*G07C 5/08*    (2006.01)
*H04W 24/04*    (2009.01)
*G01M 17/007*    (2006.01)

(52) U.S. Cl.
CPC ........... *G07C 5/008* (2013.01); *G01M 17/007* (2013.01); *G07C 5/0808* (2013.01); *G07C 5/0841* (2013.01); *H04W 24/04* (2013.01)

(58) Field of Classification Search
CPC . G01M 17/007; G07C 5/0808; G07C 5/0841; H04W 24/04
USPC ........................................................ 701/31.5
See application file for complete search history.

(56) References Cited

FOREIGN PATENT DOCUMENTS

| JP | 06-225027 A | 8/1994 |
|---|---|---|
| JP | 06225027 | * 8/1994 |
| JP | 2009-300432 A | 12/2009 |

(Continued)

OTHER PUBLICATIONS

International Search Report for Application No. PCT/JP2016/055046, ISA/JP, Tokyo, Japan, dated Apr. 26, 2016.

*Primary Examiner* — Maceeh Anwari
(74) *Attorney, Agent, or Firm* — Brooks Kushman P.C.

(57) ABSTRACT

A simulated driving system makes it possible to ensure safety during testing and to simulate driving of a vehicle or a part thereof while acquiring travel data from a vehicle traveling on a road. The simulated driving system reproduces the travel state of a vehicle on a road by acquiring travel data transmitted sequentially by wireless communication from the vehicle while the vehicle travels on a road and meanwhile using the travel data as a basis to simulate driving of a vehicle that is a test body. The simulated driving system is provided with an automatic driving device that automatically drives the test body, a dynamometer that applies a load to the test body, and a control device. The control device comprises a control unit that controls the automatic driving device or the dynamometer so that the test body enters a predetermined safe driving state when failure is detected.

12 Claims, 7 Drawing Sheets

(56) References Cited

FOREIGN PATENT DOCUMENTS

| JP | 2011-232047 | A | 11/2011 |
| JP | 2001232047 | * | 11/2011 |

* cited by examiner

SIMULATED DRIVING SYSTEM AND CONTROL DEVICE

CROSS-REFERENCE TO RELATED APPLICATIONS

This application is the National Stage of International Application No. PCT/JP20161055046, filed Feb. 22, 2016, which claims priority to JP Patent Application No. 2015-047848, filed Mar. 11, 2015, the disclosures of which are incorporated in their entirety by reference herein.

TECHNICAL FIELD

The present invention relates to a simulated driving system that reproduces the running state of a vehicle that is running on a road or a portion thereof by causing a vehicle or a portion thereof that are serving as a test body to simulate the driving of the on-road vehicle.

TECHNICAL BACKGROUND

As is shown in Patent document 1, one simulated driving system of this type is a simulated driving system that is formed such that the actual running of a vehicle on a road is reproduced by causing a vehicle that has been placed on a dynamometer to simulate the driving of the on-road vehicle in order to test the performance of that vehicle, for example, by measuring the exhaust gas thereof or the like.

However, in a conventional simulated driving system, the vehicle on the dynamometer performs simulated driving while acquiring running data in sequence from the vehicle running on the road, and as yet no system has been developed that is able to reproduce the actual on-road running in real time.

DOCUMENTS OF THE PRIOR ART

Patent Documents

[Patent document 1] Japanese Unexamined Patent Application (JP-A) No. 2009-300432

DISCLOSURE OF THE INVENTION

Problems to be Solved by the Invention

Because of this state of affairs, the inventors of the present application performed strenuous investigations in order to develop a simulated driving system that enables actual driving to be reproduced in real time, and subsequently discovered that the following problems arose.

Namely, in order to reproduce actual driving in real time, a structure in which running data from a vehicle running on a road is sequentially acquired via less communication may be considered, however, if this type of structure is employed, then if the wireless communication is unexpectedly interrupted, controlling the vehicle on the dynamometer is no longer possible. As a consequence, in a worst-case scenario, the vehicle on the dynamometer may end up running out of control so that the problem arises that safety during the testing procedure cannot be assured.

This type of problem is not limited to systems that test vehicle performance, and is a problem that may also arise in systems that, while acquiring running data from a vehicle running on a road, simulate the driving of portions of this vehicle such as the engine or power train or the like so as to test the performance of these portions.

For this reason, it is a principal object of the present invention to provide a simulated driving system that causes a vehicle or a portion thereof that are serving as a test body to perform simulated driving while sequentially acquiring running data from a vehicle running on a road, and that is able to ensure safety during a testing procedure.

Means for Solving the Problem

Namely, a simulated driving system according to the present invention is a simulated driving system that reproduces a running state of a vehicle that is running on a road, or a portion thereof, by acquiring running data transmitted sequentially via wireless communication from the vehicle running on a road, and concurrently causing a vehicle or a portion thereof that are serving as a test body to perform simulated driving based on this running data, and that is characterized in being equipped with an automatic driving device that drives the test body automatically, a dynamometer that applies a load to the test body, and a control device that controls the automatic driving device or the dynamometer, and that is also characterized in that the control device has a communication failure detection unit that detects that a failure has occurred in the wireless communication, and a control unit that, in the event where the communication failure detection unit has detected the failure, controls the automatic driving device or the dynamometer such that the test body is placed in a predetermined safe driving state.

According to the simulated driving system that is formed in this manner, because a test body is made to perform simulated driving based on running data at the same time as this running data, which is transmitted sequentially via wireless communication, is being acquired from a vehicle that is running on a road, the simulated driving can be made to closely follow the actual running of the vehicle on the road. As a consequence, it is possible to reproduce the actual running, for example, in a test chamber substantially in real time, and the performance of a vehicle that is running on a road can be tested without having to travel to a remote location such as an overseas location or the like and perform a field test.

In addition to this, if a failure does occur in the wireless communication, because the control unit controls the automatic driving device or the dynamometer such that the test body is placed in a predetermined safe driving state, even if the acquisition of the running data is prevented by this wireless communication failure, by placing the test body in this safe driving state the test body can be prevented from running out of control and safety during the testing procedure can be assured.

If wireless communication is interrupted for a longer period than a time difference occurring between the running state of a vehicle running on a road or a portion thereof and the running, state reproduced by the test body, then if the simulated driving of the test body reaches the point in time when the wireless communication was interrupted, running data subsequent to that point in time cannot be acquired, and the simulated driving performed by the test body can no longer continue.

If, on the other hand, the period of time during which wireless communication was interrupted is shorter than the aforementioned time difference, then by transmitting the running data for the period of the interruption once wireless communication has restarted, running data for the period subsequent to the interruption can be acquired before the simulated driving of the test vehicle reaches the point in time when the wireless communication was interrupted, and the simulated driving of the test vehicle can proceed uninterrupted.

For this reason, it is preferable for a structure to be employed in which the communication failure detection unit detects that the above-described failure has occurred in the event where wireless communication is interrupted for a longer period than a time difference existing between the running state of a vehicle or a portion thereof running on a road, and the running state reproduced by the test body.

According to this type of structure, it is possible, without having to unnecessarily interrupt the test procedure, to perform control such that the test vehicle is only placed in a safe driving state when this is absolutely necessary.

It is also preferable for the control device to control the automatic driving device or the dynamometer based on division data segments created by dividing a sequence of the running data.

If this type of structure is employed, then even if a failure occurs in the wireless communication that prevents running data from being acquired, the division data segments used in the simulated driving at that time can continue to be used. As a consequence, it is no longer the case that controlling the test body is no longer possible immediately after an interruption occurs in the wireless communication, and safety during the testing procedure can be reliably assured.

It is also preferable for a structure to be employed in which the control device divides the running data sequence into time segments that last from when an on-road vehicle starts running until the on-road vehicle stops running.

If this type of structure is employed, then when sin elated driving based on the division data segments has ended, because the vehicle or portion thereof has definitely come to a complete stop, safety during the test procedure can be improved even further.

Specific embodiments of a safe driving state include a state in which a vehicle has reached a predetermined speed, and a state in which a vehicle has stopped.

Moreover, a control device according to the present invention is a control device that is used in a simulated driving system which reproduces a running state of a vehicle that is running on a road or a portion thereof while acquiring running data transmitted sequentially via wireless communication from the vehicle running on a road, and which causes a vehicle or a portion thereof that are serving as a test body to perform simulated driving based on this running data, and that is used together with an automatic driving device that drives the test body automatically, and a dynamometer that applies a load to the test body, and that includes a communication failure detection unit that detects that a failure has occurred in the wireless communication, and a control unit that, in the event where the communication failure detection unit has detected the failure, controls the automatic driving device or the dynamometer such that the test body is placed in a predetermined safe driving state.

If this type of control device is employed, then the above-described actions and effects can be achieved.

Effects of the Invention

According to the present invention that is formed in the above-described manner, by causing a vehicle or a portion thereof to perform simulated driving while acquiring running data from a vehicle that is running on a road, it is possible to ensure safety during the testing procedure while reproducing the actual running substantially in real time.

DESCRIPTION OF THE REFERENCE NUMERAL

100 . . . Simulated driving system
10 . . . Automatic driving device
20 . . . Dynamometer
30 . . . Control device
31 . . . Division data creation unit
32 . . . Division data storage unit
33 . . . Control unit
34 . . . Communication failure detection unit
SV . . . Server

BEST EMBODIMENTS FOR IMPLEMENTING THE INVENTION

Hereinafter, an embodiment of a simulated driving system according to the present invention will be described with reference made to the drawings.

A simulated driving system 100 according to the present embodiment is used to test the performance of a vehicle V1, which is serving as a test body, and together with, for example, an exhaust gas analysis system or the like (not shown in the drawings) forms a portion of a vehicle performance testing system.

Note that the test body is not limited to the vehicle V1 and may also be formed by a portion of the vehicle V1 such as the engine or power train thereof.

Figure 1:
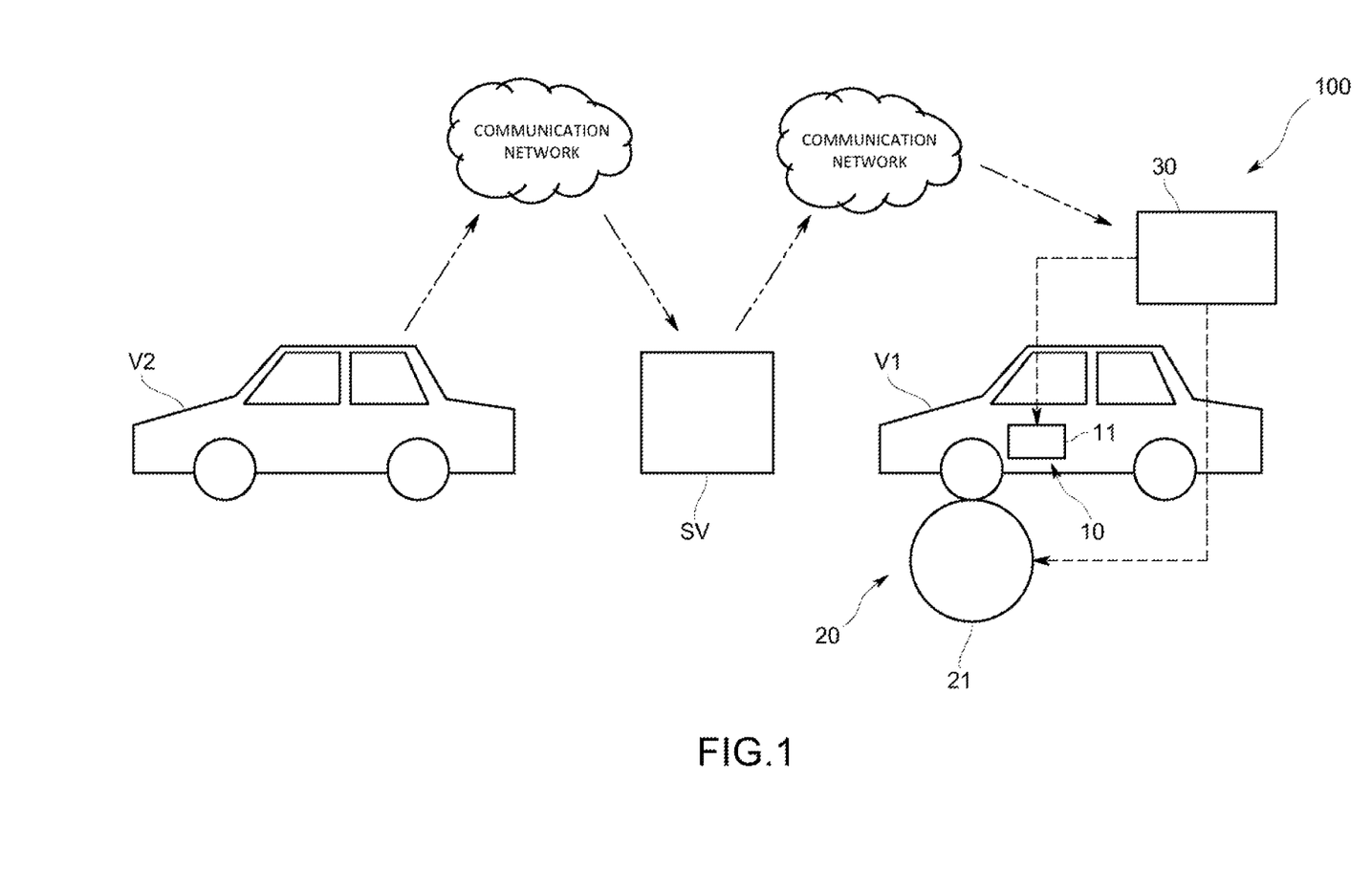
FIG. 1 is a view schematically showing a structure of a simulated driving system of the present embodiment.

Specifically, as is shown in FIG. 1, the simulated driving system 100 is equipped with an automatic driving device 10 that automatically drives the vehicle V1, a dynamometer 20 that applies a load to the vehicle V1, and a control device 30 that controls the automatic driving device 10 and the dynamometer 20.

Note that the vehicle V1, the automatic driving device 10, the dynamometer 20, and the control device 30 are all provided, for example, in a test chamber.

The automatic driving device 10 is formed such that the operations relating to the depression amounts of the accelerator pedal, clutch pedal, and brake pedal, as well as operations of the gear shift lever and the like are perforated automatically.

Specifically, this structure has a driving robot 11 that is mounted in a driver's cabin of the vehicle V1 and operates the accelerator pedal, brake pedal, clutch pedal and the like, and by supplying control signals to this driving robot 11, is able to drive the vehicle V1 automatically.

The dynamometer 20 functions as a drive device that drives the vehicle V1 by working as an electric motor, and also functions as a load device that applies a load to the vehicle V1 by working as a power generator.

Specifically, this structure is formed so as to have a chassis roller 21 such as a rotating drum or an endless belt or the like on which drive wheels such as, for example, front wheels or the like are mounted, and a motor (not shown in the drawings) that is connected to the chassis roller 21 and causes the chassis roller 21 to rotate, and by supplying control signals to this motor, is able to drive the drive wheels, or apply a load to the drive wheels.

The control device 30 causes the vehicle V1 to perform simulated driving on the dynamometer 20, and by causing the simulated driving of this vehicle V1 to imitate the actual running of a vehicle V2 on a road, the actual running of the vehicle V2 can be reproduced in real time.

Note that the 'real time' referred to here is not limited to describing a state in which there is absolutely no time difference between the running state of the vehicle V2 on a road and the running state reproduced by the vehicle V1 that is serving as a test body, and is a concept that includes a state in which a time difference (hereinafter, this may also be referred to as a delay time) is generated between the running state of the vehicle V1 and the running state of the vehicle V2. Here, the control device 30 controls the automatic driving device 10 and the dynamometer 20 such that the running state of the vehicle V1 serving as a test body imitates the running state of the vehicle V2 on the road after a predetermined delay time.

Specifically, the control device 30 is formed such that it sequentially acquires from the vehicle V2 that is running on the road running data relating to this running via wireless communication that uses a predetermined communication network such as the Internet or an intranet, and controls the automatic driving device 10 and the dynamometer 20 based on this running data.

Here, various types of data acquired via an ECU, a TCU, a driving recorder, and a vehicle-mounted exhaust gas analyzer and the like that are mounted in the on-road vehicle V2 are included in the aforementioned running data. More specifically, this running data includes the vehicle speed, engine torque, running resistance, outside air temperature, tire temperature, wind speed, the road slope, and exhaust gas analysis results.

Figure 2:
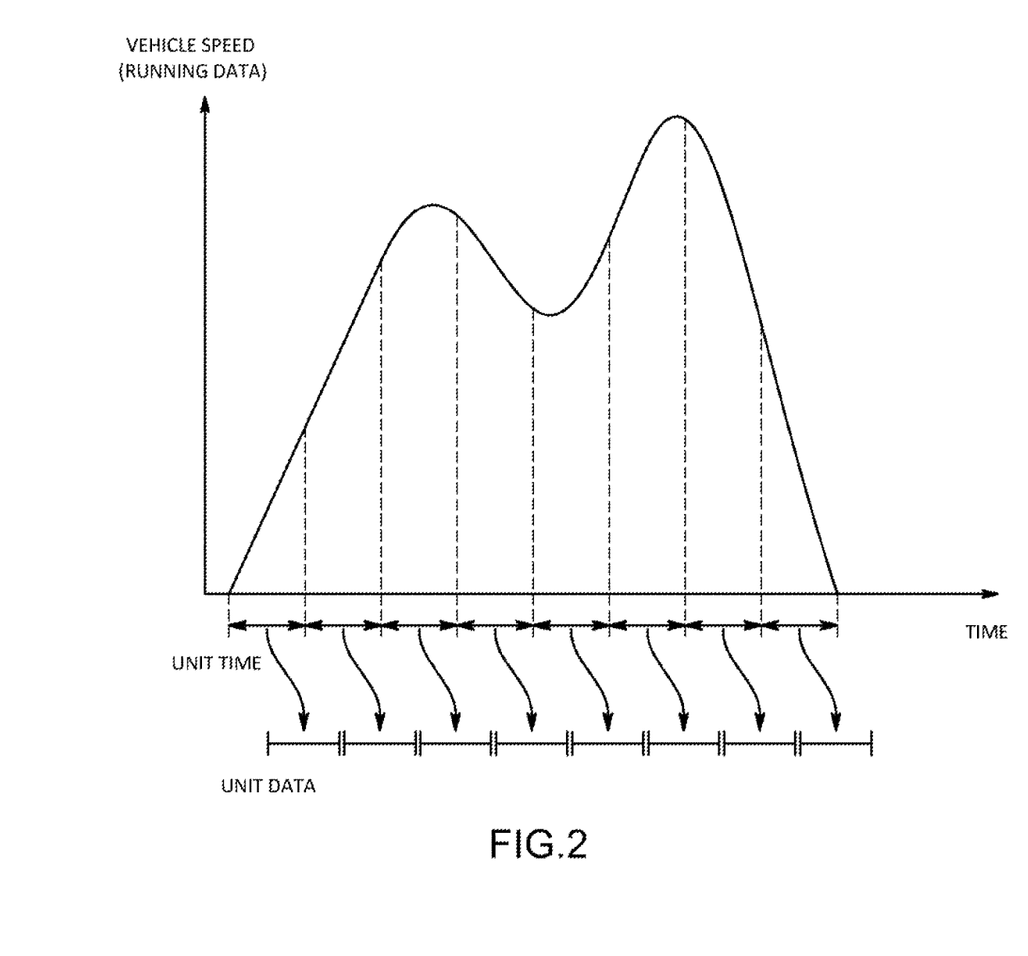
FIG. 2 is a view illustrating running data of the present embodiment.

Note that, as is shown in FIG. 2, the vehicle V2 that is running on a road is formed such that it divides the aforementioned various types of running data obtained from the running into unit time segments that are set in advance, and then transmits these as unit data.

The control device 30 of the present embodiment utilizes client server wireless communication, and is formed such that running data transmitted via wireless communication from the vehicle V2 that is running on a road is acquired via wireless communication through a server SV.

Figure 3:
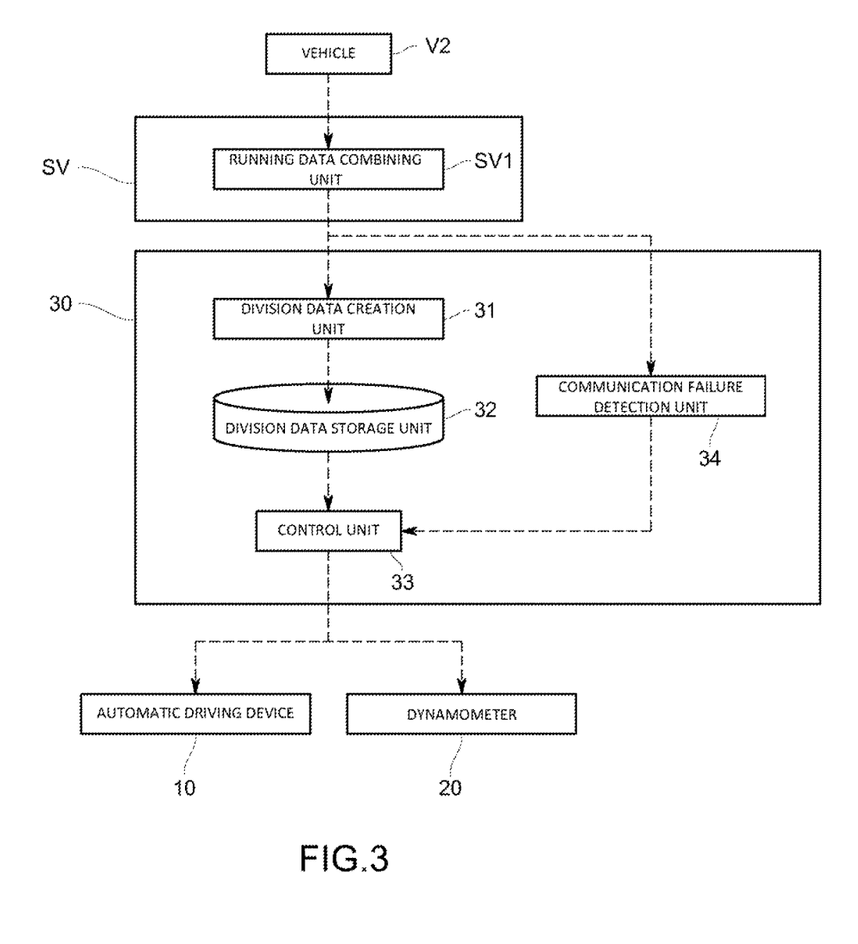
FIG. 3 is a function block diagram showing functions of a control device of the present embodiment.

As is shown in FIG. 3, the server SV has a running data combining unit SV1 that acquires the unit data transmitted from the on-road vehicle V2, and combines the respective unit data segments together so as to create a running data sequence. The running data combining unit SV1 is formed such that it transmits the running data sequence to the control device 30 via wireless communication using an intranet or the like.

The control device 30 is provided with a CPU, memory, an A/D converter, and a D/A converter and the like, and is formed such that, as is shown in FIG. 3, as a result of the CPU and devices peripheral thereto operating in mutual collaboration in accordance with a program stored in a predetermined area of the memory, the control device 30 performs the functions of a division data creation unit 31, a division data storage unit 32, a control unit 33, and a communication failure detection unit 34.

Hereinafter, operations of the control device 30 will be described in conjunction with a description of the respective units 31 to 34.

Firstly, the division data creation unit 31 sequentially acquires via wireless communication through the server SV running data that has been transmitted via wireless communication from the vehicle V2 that is running on a road, and divides the acquired running data sequence so as to create division data segments.

Note that the division data creation unit of the present embodiment is formed such that it creates a plurality of division data segments by dividing the running data sequence in accordance with predetermined conditions.

In the present embodiment, even if wireless communication is interrupted partway through a test, then as a result of the subsequent restarting of the wireless communication, the running data that was acquired by the on-road vehicle V2 during the interruption is retransmitted to the division data creation unit 31 via the server SV. In other words, the division data creation unit 31 of the present embodiment is able to acquire the entire running data.

Based on this, the division data creation unit 31 creates the division data segments by combining the running data acquired, before the wireless communication was interrupted with the running data acquired after the wireless communication was restarted.

Figure 4:
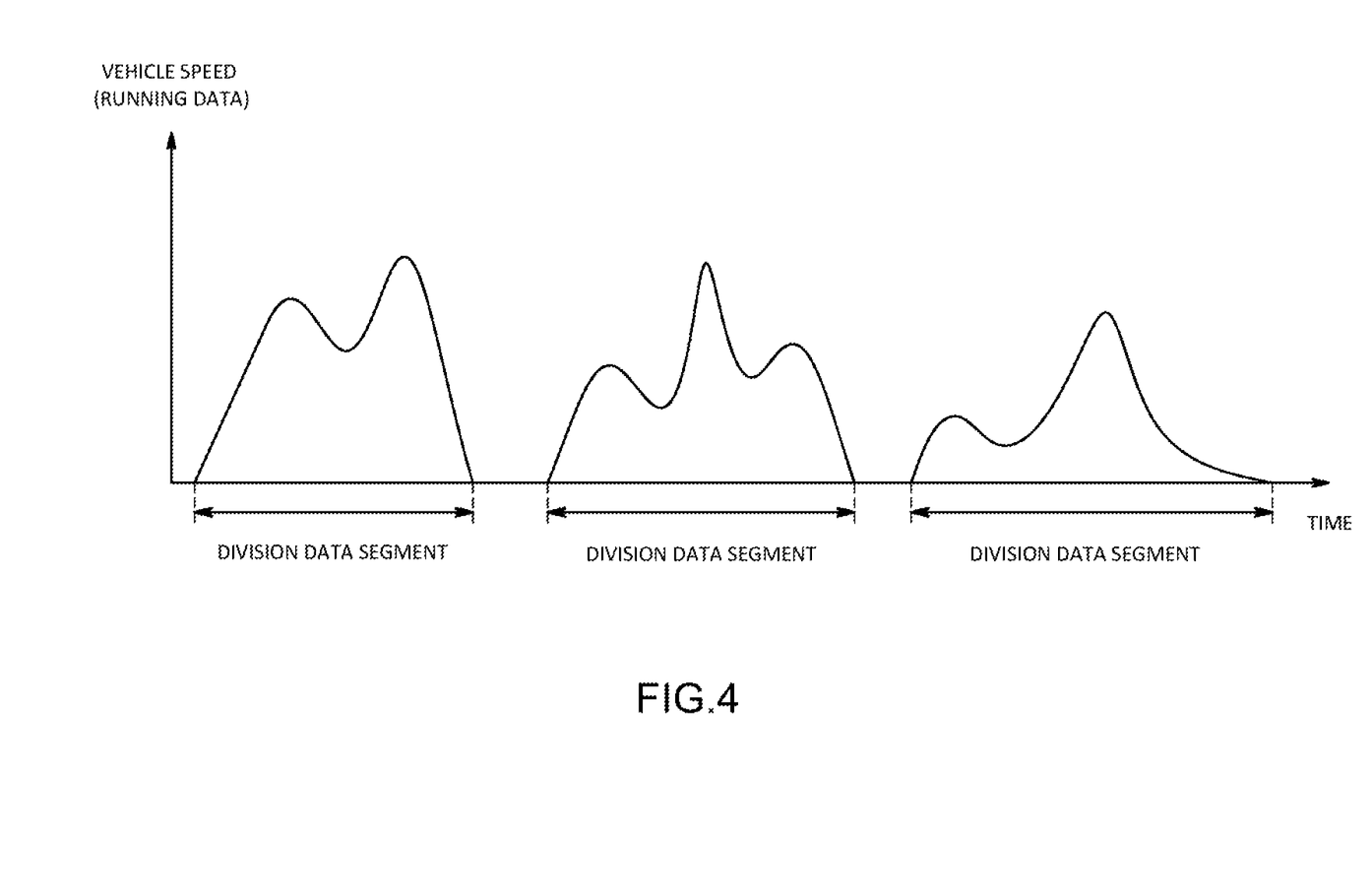
FIG. 4 is a graph illustrating division data segments of the present embodiment.

The aforementioned predetermined conditions are set such that at least the running data from when the on-road vehicle V2 starts running until it stops running are included therein, and, here, as is shown in FIG. 4, the predetermined conditions are set such that the running data is divided into time segments lasting from when the on-road vehicle V2 starts running until it stops running, namely, into time segments that last from a state in which the vehicle speed is zero until a state in which the vehicle speed is zero once again.

More specifically, the division data creation unit 31 extracts vehicle stop time points when the vehicle speed is zero from among the running data sequence transmitted from the on-road vehicle V2, and uses the time periods from the vehicle stop time point immediately prior to when the on-road vehicle V2 starts running until the vehicle stop time point when this vehicle V2 stops running to create the division data segments.

In addition, the division data creation unit 31 sequentially stores the respective division data segments that it has created in the division data storage unit 32 that is set in a predetermined area of the memory.

The control unit 33 acquires the division data segments created by the division data creation unit 31 from the division data storage unit 32, and controls the automatic driving device 10 and the dynamometer 20 based on the respective division data segments.

The control unit 33 of the present embodiment controls the automatic driving device 10 and the dynamometer 20 such that the running state of the vehicle V1, which is serving as the test body, reproduces the manning state of the vehicle V2, which is running on a road, after the aforementioned predetermined delay time.

More specifically, the control unit 33 acquires the division data segments in the sequence in which they were created, and transmits control signals to the driving robot 11 of the automatic driving device 10 and to the motor of the dynamometer 20 such that the actual running shown by the respective division data segments is reproduced by the vehicle V1 on the dynamometer 20.

Here, the control unit 33 is formed such that it transmits the control signals based on the most recent division data segment out of the division data segments created by the division data creation unit 31. As a consequence of this, the vehicle V1 on the dynamometer 20 can be made to perform simulated driving in such as way as to reproduce in substantially real time the actual running of the vehicle V2 on a road.

The communication failure detection unit 34 detects when a failure occurs either in the wireless communication between the vehicle V2 that is running on a road and the server SV, or in the wireless coma communication between the server SV and the control device 30.

More specifically, a structure is formed in which, in the event where one of these wireless communications is interrupted for a longer time than the above described delay time, this interruption is detected as a failure. When a failure is detected, a failure detection signal is transmitted to the control unit 33.

In the present embodiment, the control unit 33 acquires this failure detection signal, it controls the automatic driving device 10 and the dynamometer 20 such that the vehicle V1, which is the test body, is placed in a predetermined safe driving state.

More specifically, the control unit 33 is formed such that in the event where it acquires a failure detection signal, it transmits a control signal to the automatic driving device 10 and the dynamometer 20 that, for example, causes the vehicle speed of the vehicle V1 to decrease to zero. The control unit 33 of the present embodiment is formed such that in the event where it receives a failure detection signal, it controls the automatic driving device 10 and the dynamometer 20 using division data segments that it has already acquired at that time from the division data storage unit 32, and then maintains the state that exists when the aforementioned control by the control unit 33 has ended and the vehicle speed of the vehicle V1 has dropped to zero as the safe driving state.

Figure 5:
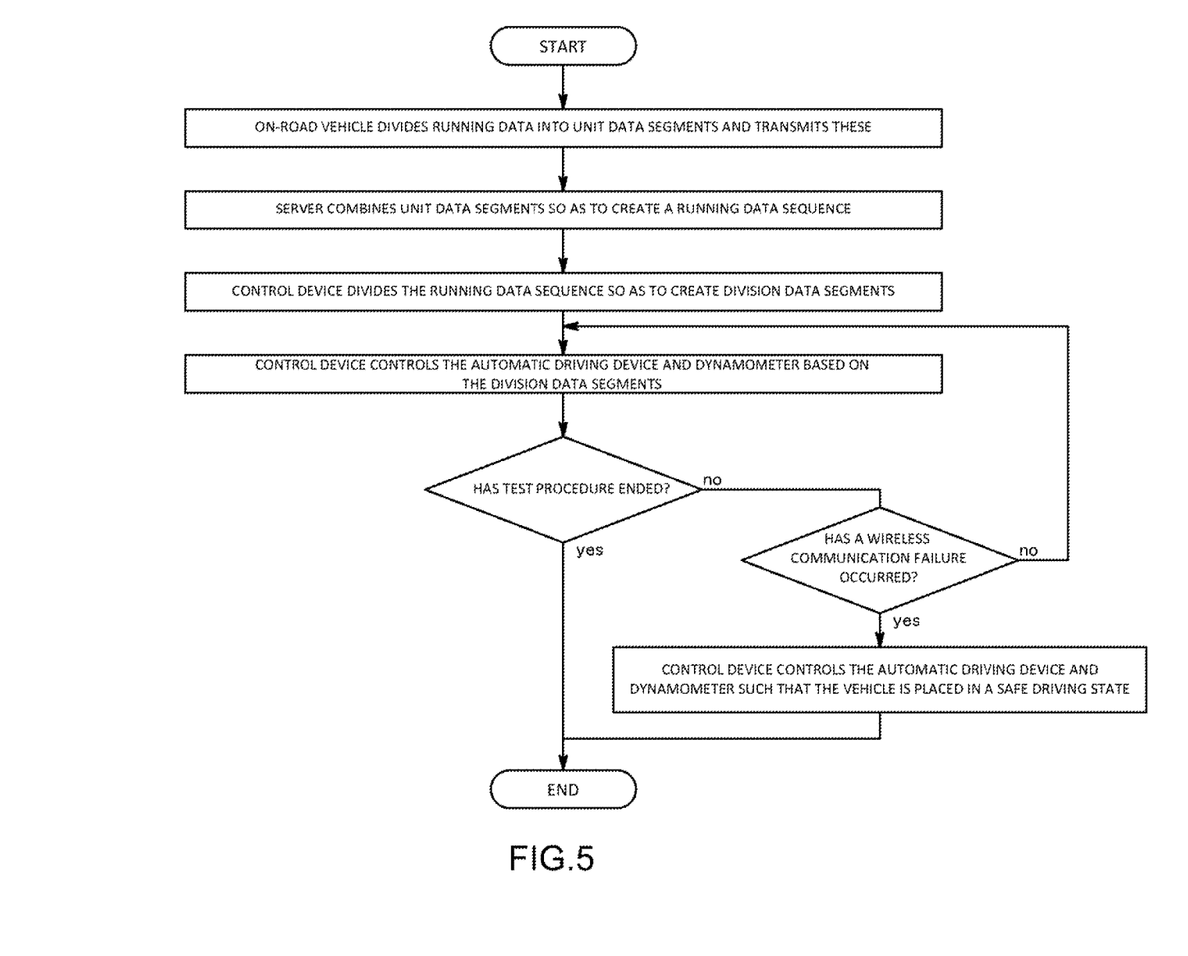
FIG. 5 is a flowchart showing an operation of the simulated driving system of the present embodiment.

Next, a specific operation of the simulated driving system 100 of the present embodiment will be described with reference made to the flowchart shown in FIG. 5.

Firstly, the vehicle V2 that is running along a road divides its running data into unit time segments that have been determined in advance, and then transmits each of these divided unit data segments to the server SV via wireless communication.

Next, the server SV combines the respective unit data segments so as to create a running data sequence, and transmits this running data sequence to the control unit 30.

The control device 30 divides the acquired running data sequence using predetermined conditions so as to create division data segments, and controls the automatic driving device 10 and the dynamometer 20 based on the respective division data segments.

Note that, as is described above, the division data segments are created by dividing the running data sequence into time segments that last from when the on-road vehicle V2 starts running until it stops running, namely, from a state in which the vehicle speed is zero until a state in Which the vehicle speed is once again zero.

Next, the control device 30 determines whether or not all of the created division data segments have been used, and if all of the division data segments have been used, then the performance test is ended.

While the performance test is still continuing, the control device 30 detects whether or not a failure has occurred in the wireless communication.

Specifically, as is described above, the control device 30 of the present embodiment is formed such that, if wireless communication is interrupted for a longer period than the delay time, it detects this interruption as a failure.

In the event where the control device 30 detects a failure, it controls the automatic driving device 10 and the dynamometer 20 such that the vehicle V1, which is serving as the test body, is placed in a safe driving state.

On the other hand, if the period when the wireless communication vas interrupted is shorter than the delay time, in other words, if wireless communication is restarted within the delay time, the control device 30 of the present embodiment begins to acquire the running data that it was not able to acquire during the period when wireless communication was interrupted, and uses this running data to control the automatic driving device 10 and the dynamometer 20 without interrupting the test.

According to the simulated driving system 100 according to the present embodiment that is formed in the above-described manner, because the vehicle V1 is made to perform simulated driving at the same time as it is acquiring running data via wireless communication from the vehicle V2 that is running on a road, this simulated driving can be made to imitate the actual running of the vehicle V2 on the road. As a consequence, it is possible to reproduce the actual running in a test chamber substantially in real time, and the performance of the vehicle V2 that is running on a road can be tested without having to travel to a remote location such as an overseas location or the like and perform a field test. Because of this, if, for example, there is a malfunction in the vehicle V2 while in a remote location, the actual running of the malfunctioning vehicle can be reproduced immediately in the test chamber, and the cause of the malfunction can be quickly ascertained.

Moreover, if a failure occurs in the wireless communication, because the control unit 33 controls the automatic driving device 10 or the dynamometer 20 such that the vehicle V1, which is serving as the test body, is placed in a safe driving state, even if this wireless communication failure prevents the running data from being acquired, the vehicle can be prevented from running out of control and safety during the testing procedure can be assured.

In addition to this, because the control unit 33 controls the automatic driving device 10 and the dynamometer 20 based on the respective division data segments, even if the wireless communication is interrupted, the division data segments that were being used for the control at that time can continue to be used. As a consequence, it is no longer the case that controlling the automatic driving device 10 and the dynamometer 20 is no longer possible immediately after an interruption to the wireless communication occurs, and safety during the testing procedure an be reliably assured.

Moreover, because the control device 30 controls the automatic driving device 10 and the dynamometer 20 at the same time as it is acquiring running data, the number of times when an operator needs to intervene in an operation can be reduced, and automation of the simulated driving and testing procedure can be achieved.

Furthermore, because the functions of the division data creation unit 31 can be achieved by the control device 30 in a test chamber, settings relating to the division data can easily be altered in the test chamber without the settings of the server SV or the settings of the various instruments mounted in the on-road vehicle V2 having to be altered.

As a consequence, it is not necessary to actually travel to the locations of the server SV and the on-road vehicle V2 in order to alter the settings of the division data segments.

Because the division data creation unit 31 is formed such that it creates division data segments by combining the running data acquired before wireless communication was interrupted with the running data acquired after wireless communication was restarted, even if there is an interruption to the wireless communication, as a result of wireless communication subsequently being restarted, the simulated driving can be continued without interruption.

Because the division data creation unit 31 uses the running data sequences transmitted from the vehicle V2 between the time when the on-road vehicle V2 starts running until it stops running to create the division data segments, when the simulated driving based on the respective division data segments has ended, the vehicle V1 on the dynamometer 20 is invariably in a stopped state.

As a consequence, even if wireless communication does get interrupted during a test, the vehicle V1 can be forestalled from running out of control on the dynamometer 20, and safety during a test can be improved even further.

Moreover, because the simulated driving system 100 forms a portion of a vehicle performance testing system together with an exhaust gas analysis system, analysis results obtained from the exhaust gas analysis system can be compared substantially in real time with analysis results obtained from a vehicle-mounted exhaust gas analysis device that is mounted in the on-road vehicle 2, so that it is possible, for example, to verify the accuracy and the like of the vehicle-mounted exhaust gas analysis device in a test chamber.

Furthermore, because the running state of the vehicle V1, which is serving as a test body, is made to imitate the running state of the vehicle V2, which is running on a road, it is possible to compare various types of running data relating to the on-road vehicle V2 in real time to various types of test data relating to the test-body vehicle V1.

Note that the present invention is not limited to the above-described embodiment.

For example, the control device 30 of the above-described embodiment is formed such that it creates created data by dividing acquired running data, and controls the automatic driving device 10 and the dynamometer 20 based on these division data segments, however, it is not absolutely essential that division data segments be created.

Figure 6:
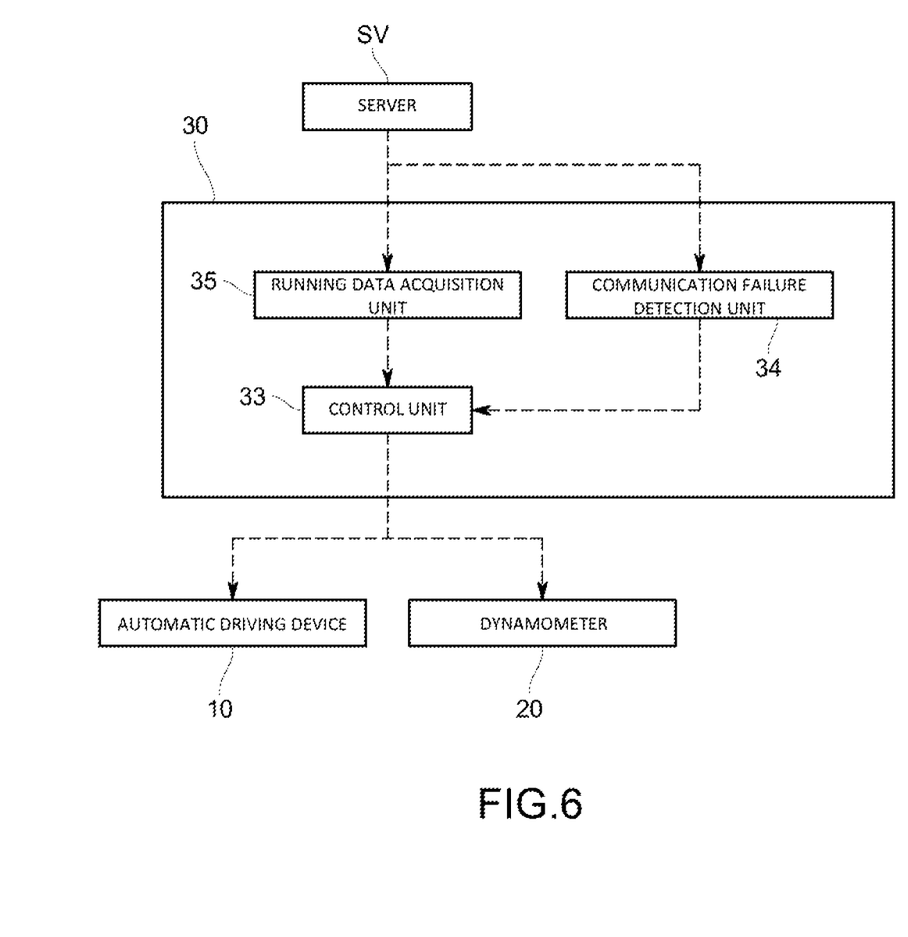
FIG. 6 is a function block diagram showing functions of a control device according to another embodiment of the present invention.

Specifically, as is shown in FIG. 6, it is also possible for the control device 30 to have a running data acquisition unit 35 that sequentially acquires running data using wireless communication, the control unit 33 that controls the automatic driving device 10 and the dynamometer 20 based on the acquired running data, and the communication failure detection unit 34 that detects whether a failure has occurred in the wireless communication by acquiring abnormality signals from, for example, the server SV.

In addition, in the event where a failure has been detected by the communication failure detection unit 35, the control unit 33 controls the automatic driving device 10 and the dynamometer 20, and forcibly drives the vehicle V1 such that the vehicle V1 is placed in a predetermined safe driving state.

This safe driving state is a state in which the vehicle V1 is stopped, or a state in which the vehicle speed of the vehicle V1 is a predetermined speed.

Specifically, for example, as is shown in FIG. 7(a), a structure may be employed in which, in the event where a failure has been detected by the communication failure detection unit 34, the control unit 33 controls the automatic driving device 10 and the dynamometer 20 such that the vehicle speed of the vehicle V1 is reduced until it reaches zero.

Alternatively, for example, as is shown in FIG. 7(b), a structure may also be employed in which, in the event where a failure has been detected by the communication failure detection unit 34, the control unit 33 controls the automatic driving device 10 and the dynamometer 20 such that the speed of the vehicle V1 at that particular time is maintained.

Figure 7:
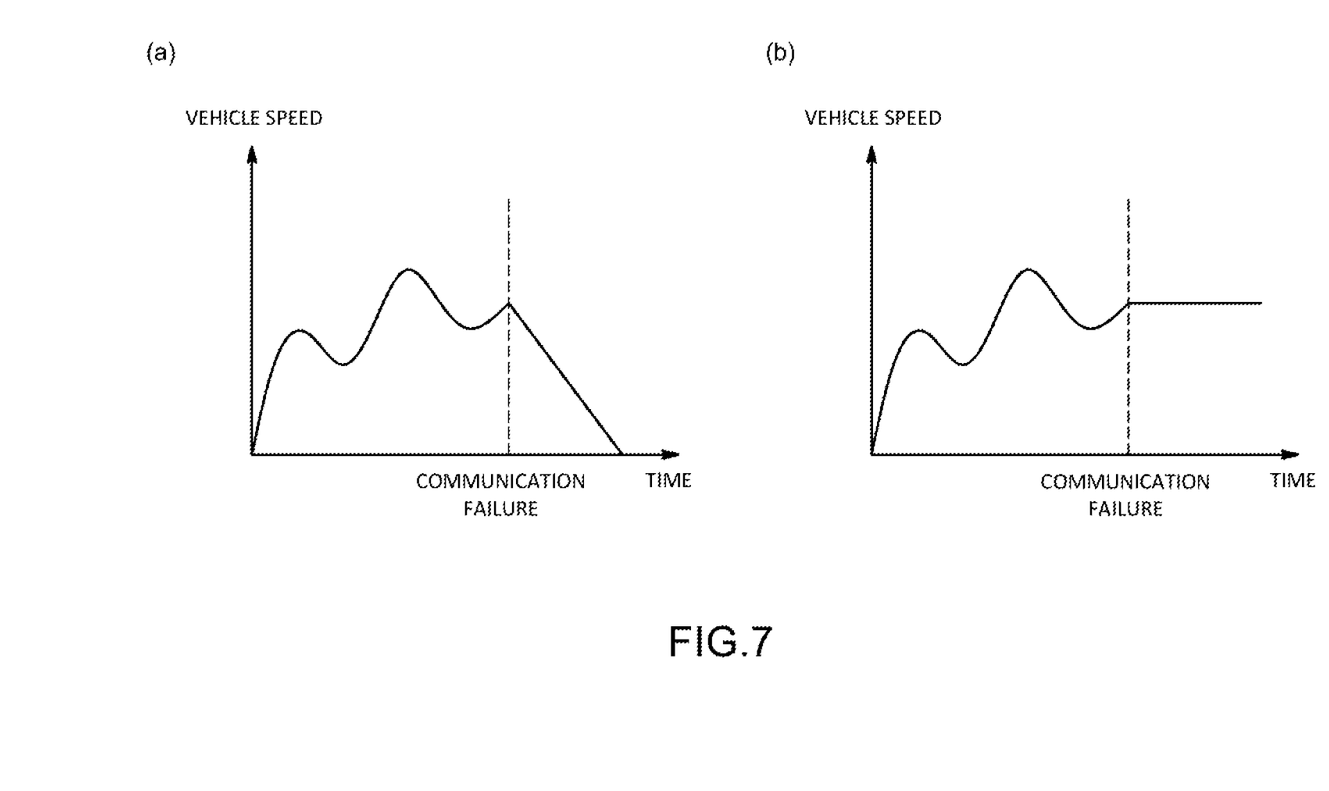
FIG. 7 is a graph illustrating a control method according to another embodiment of the present invention.

Furthermore, it is also possible when a failure is detected by the communication failure detection unit 34 for the control unit 33 to control the automatic driving device 10 and the dynamometer 20 such that the vehicle speed of the vehicle V1 is reduced to a predetermined speed and this vehicle speed is then maintained.

According to the above-described structure, not only is it possible to imitate the running of the on-road vehicle V2 closer to real time, but because the vehicle V1 on the dynamometer 20 is forcibly driven so that it is placed in a predetermined safe driving state when a communication failure is detected, safety during the testing procedure can be assured.

Moreover, in the above-described embodiment, the division data creation unit divides the running data into time segments that last from when the on-road vehicle starts running until it stops running, however, the running data may also be divided into time segments that last from when the on-road vehicle starts running until the next time it starts running, or into time segments that last form when the on-road vehicle starts running until it stops running a predetermined number of times. Furthermore, the division data creation unit may also divide the running data into fixed time segments that are determined in advance.

In addition, the division data creation unit may also, for example, divide the running data into distance segments that extend from when the on-road vehicle starts running until it stops running, or divide the running data into fixed distance segments.

Furthermore, in the above-described embodiment, the functions of the division data creation unit and the division data storage unit are performed by a control device, however, it is also possible for the functions of either one or both of the division data creation unit and the division data storage unit to be performed by a device that is mounted in the vehicle running on the road or by a server.

Naturally, it is also possible for the functions of a running data combination unit, which are performed by the server of the above-described embodiment, to instead by performed by a control device.

In addition, in the above-described embodiment, the control device is formed such that it controls an automatic driving device and a dynamometer, however, it is also possible for the control device to control just one of the automatic driving device and the dynamometer.

Moreover, the control device of the above-described embodiment is formed such that when wireless communication that had been interrupted partway through a test is restarted, the test is also restarted from partway through, however, it is also possible for the control device to be formed such that when the wireless communication is restarted, the test is restarted once again from the beginning.

Moreover, the automatic driving device of the above-described embodiment is a device that drives a vehicle automatically, however, it may also be a device that drives a portion of a vehicle such as an engine and power train automatically.

Examples of this type of automatic driving device include, for example, those that control the revolution speed of an engine automatically, and those that drive a power train automatically.

Furthermore, the control device of the above-described embodiment acquires via wireless communication using a server running data that was transmitted via wireless communication from a vehicle running on a road, however, it is not absolutely essential that communication between the server and the control device be performed wirelessly, and it is also possible for the control device to acquire running data from a server via wired communication.

In addition to these, the present invention is not limited to the above-described embodiment and it is to be understood that various modifications and the like may be made thereto insofar as they do not depart from the spirit or scope of the present invention.

INDUSTRIAL APPLICABILITY

According to the above-described present invention, by causing a vehicle or a portion thereof to perform simulated driving at the same time as running data is being acquired from a vehicle running on a road, it is possible, while reproducing this actual running substantially in real time, to assure safety during the testing procedure.

What is claimed is:

1. A simulated driving system that reproduces a running state of a vehicle that is running on a road, or a portion thereof, by acquiring running data transmitted sequentially via wireless communication from the vehicle, and concurrently causing another vehicle or a portion thereof that is serving as a test body to perform simulated driving based on the running data, comprising:
an automatic driving device that drives the test body automatically;
a dynamometer that applies a load to the test body; and
a control device that controls the automatic driving device or the dynamometer, wherein the control device detect, via a communication failure detection unit of the processor, that a failure has occurred in the wireless communication includes a processor configured to, responsive to the wireless communication being interrupted for a longer period than a time difference existing between the running state of the vehicle and a running state reproduced by the test body and control, via a control unit of the processor, the automatic driving device or the dynamometer such that the test body is placed in a predetermined safe driving state responsive to the detecting.

2. The simulated driving system according to claim 1, wherein the control device controls the automatic driving device or the dynamometer based on division data segments that are created by dividing a sequence of the running data.

3. The simulated driving system according to claim 2, wherein the processor is further configured to divide, via a division data creation unit of the processor, the sequence of the running data into time segments that last from when the vehicle starts running until the vehicle stops running.

4. The simulated driving control system according to claim 1, wherein the predetermined safe driving state is defined by the another vehicle reaching a predetermined speed or stopping.

5. A control device that is used in a simulated driving system which reproduces a running state of a vehicle that is running on a road, or a portion thereof, while acquiring running data transmitted sequentially via wireless communication from the vehicle, and which causes another vehicle or a portion thereof that is serving as a test body to perform simulated driving based on the running data, and that is used together with an automatic driving device that drives the test body automatically, and a dynamometer that applies a load to the test body, comprising:
a processor configured to,
detect, via a communication failure detection unit of the processor, that a failure has occurred in the wireless communication responsive to the wireless communication being interrupted for a longer period than a time difference existing between the running state of the vehicle and a running state reproduced by the test body, and
control, via a control unit of the processor, the automatic driving device or the dynamometer such that the test body is placed in a predetermined safe driving state responsive to the detecting.

6. The control device according to claim 5, wherein the processor is further configured to control, via the control unit, the automatic driving device or the dynamometer based on division data segments that are created by dividing a sequence of the running data.

7. The control device according to claim 6, wherein the processor is further configured to divide, via a division data creation unit of the processor, the sequence of the running data into time segments that last from when the vehicle starts running until the vehicle stops running.

8. The control device according to claim 5, wherein the predetermined safe driving state is defined by the another vehicle reaching a predetermined speed or stopping.

9. A method of operating a control device that is used in a simulated driving system which reproduces a running state of a vehicle that is running on a road, or a portion thereof while acquiring running data transmitted sequentially via wireless communication from the vehicle, and which causes another vehicle or a portion thereof that is serving as a test body to perform simulated driving based on the running data, and that is used together with an automatic driving device that drives the test body automatically, and a dynamometer that applies a load to the test body, the method comprising:
detecting, via a communication failure detection unit of a processor of the control device, that a failure has occurred in the wireless communication responsive to the wireless communication being interrupted for a longer period than a time difference existing between the running state of the vehicle and a running state reproduced by the test body, and
controlling, via a control unit of the processor, the automatic driving device or the dynamometer such that the test body is placed in a predetermined safe driving state responsive to the detecting.

10. The method according to claim 9, wherein the controlling is based on division data segments that are created by dividing a sequence of the running data.

11. The method according to claim 10 further comprising dividing, via a division data creation unit of the processor, the sequence of the running data into time segments that last from when the vehicle starts running until the vehicle stops running.

12. The method according to claim 9, wherein the predetermined safe driving state is defined by the another vehicle reaching a predetermined speed or stopping.

* * * * *